(12) United States Patent
Woempner et al.

(10) Patent No.: US 7,954,611 B2
(45) Date of Patent: *Jun. 7, 2011

(54) COMPOSITE PROFILE PROVIDED WITH A SUPPORT BODY MADE OF A LIGHT METAL MATERIAL AND A PROFILED STRIP AND A METHOD FOR PRODUCING SAID PROFILE

(75) Inventors: Diethelm Woempner, Bodman-Ludwigshafen (DE); Timo Netzel, Volkertshausen (DE)

(73) Assignee: Engineered Products Switzerland AG (Ltd.), Zurich (CH)

( * ) Notice: Subject to any disclaimer, the term of this patent is extended or adjusted under 35 U.S.C. 154(b) by 930 days.

This patent is subject to a terminal disclaimer.

(21) Appl. No.: 11/815,018

(22) PCT Filed: Dec. 20, 2005

(86) PCT No.: PCT/EP2005/013718
§ 371 (c)(1),
(2), (4) Date: Jul. 30, 2007

(87) PCT Pub. No.: WO2006/081863
PCT Pub. Date: Aug. 10, 2006

(65) Prior Publication Data
US 2010/0044175 A1  Feb. 25, 2010

(30) Foreign Application Priority Data
Jan. 31, 2005 (DE) .......................... 10 2005 004 547

(51) Int. Cl.
*B60M 1/00* (2006.01)

(52) U.S. Cl. .............................. 191/22 DM; 191/29 DM
(58) Field of Classification Search ................ 191/22 R, 191/22 DM, 29 R, 29 DM, 30, 33 PM; 238/148; 104/306
See application file for complete search history.

(56) References Cited

U.S. PATENT DOCUMENTS

| 588,541 | A | * | 8/1897 | Walkins ...................... 191/22 C |
| 3,917,039 | A | * | 11/1975 | Maitland ................. 191/29 DM |
| 4,167,866 | A | | 9/1979 | Ames et al. |
| 4,215,560 | A | | 8/1980 | Ames et al. |
| 5,047,595 | A | | 9/1991 | Hartland |
| 5,279,397 | A | * | 1/1994 | Hartland ................. 191/22 DM |
| 6,935,473 | B1 | | 8/2005 | Gluck |
| 6,983,834 | B1 | * | 1/2006 | Kraudy .................... 191/22 DM |
| 7,712,591 | B2 | * | 5/2010 | Wompner et al. ....... 191/22 DM |

FOREIGN PATENT DOCUMENTS

| DE | 25 46 026 | 4/1977 |
| DE | 44 10 688 | 10/1995 |
| DE | 19840720 | 3/2000 |
| DE | 202005006592 | 8/2005 |
| EP | 1683676 | 7/2006 |

\* cited by examiner

*Primary Examiner* — S. Joseph Morano
*Assistant Examiner* — R. J. McCarry, Jr.
(74) *Attorney, Agent, or Firm* — Bachman & LaPointe, P.C.

(57) ABSTRACT

A composite profile comprising a carrier profile made of a light metal material and a profiled strip which is made of a harder material and covers the top surface of the carrier profile. An insertable bar is added to the profiled strip on each longitudinal side in a position parallel to the direction thereof and is inserted into a lateral slot embodied therein. The insertable bar is firmly connected to the profiled strip thereof by a weld seam.

22 Claims, 5 Drawing Sheets

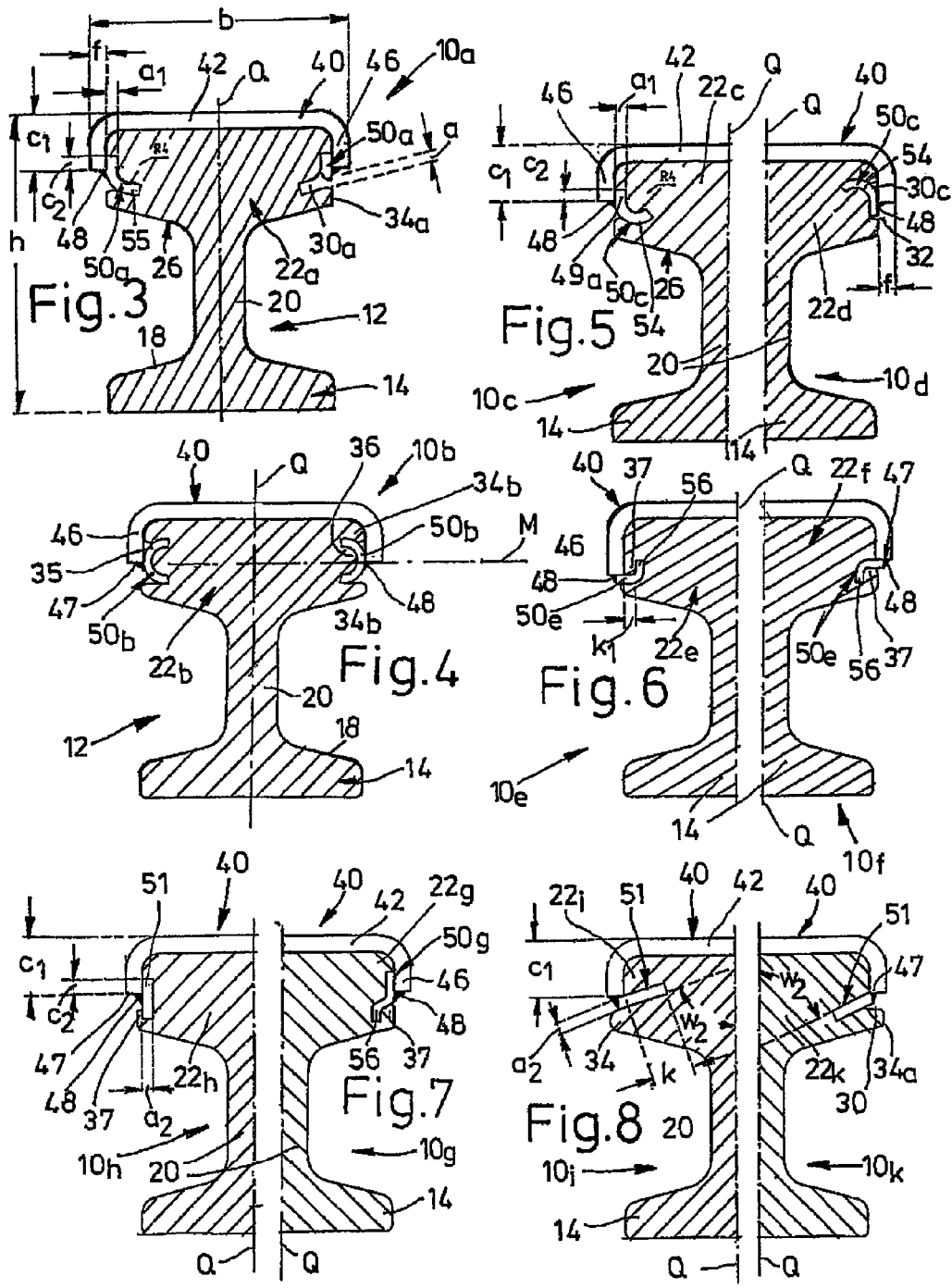

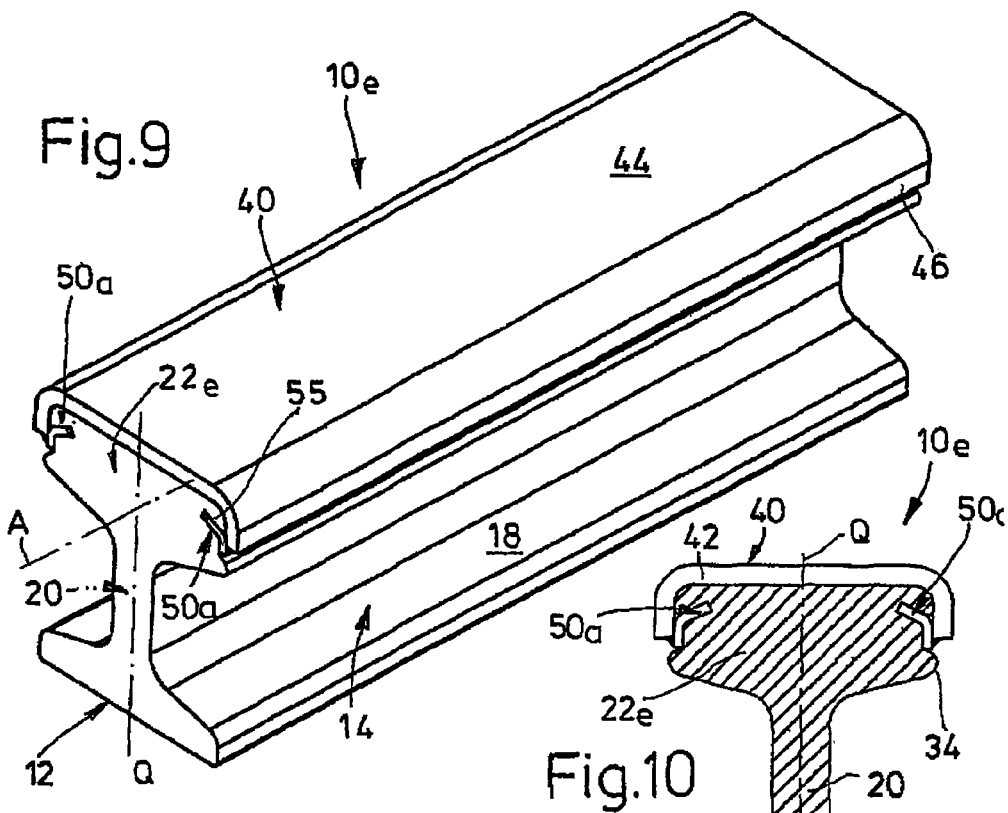
Fig. 9
Fig. 10
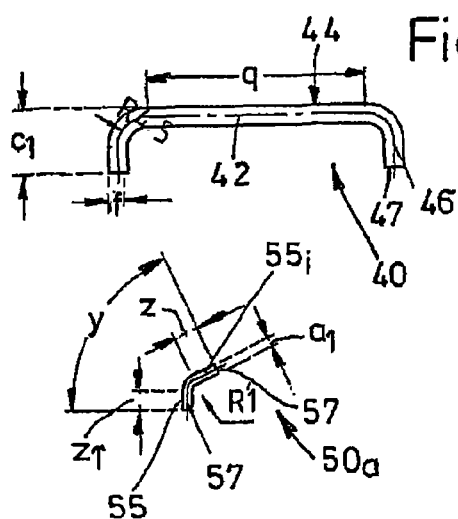
Fig. 11
Fig. 12
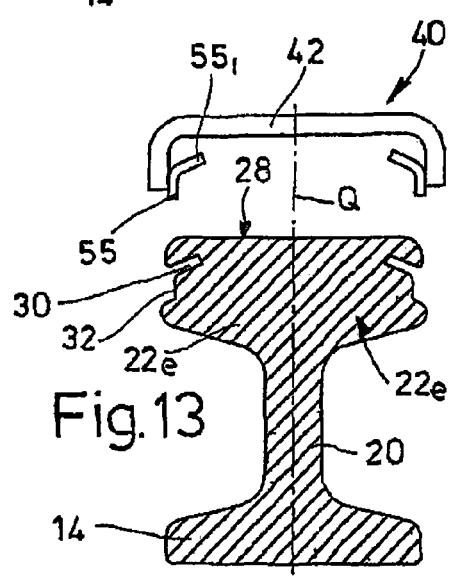
Fig. 13

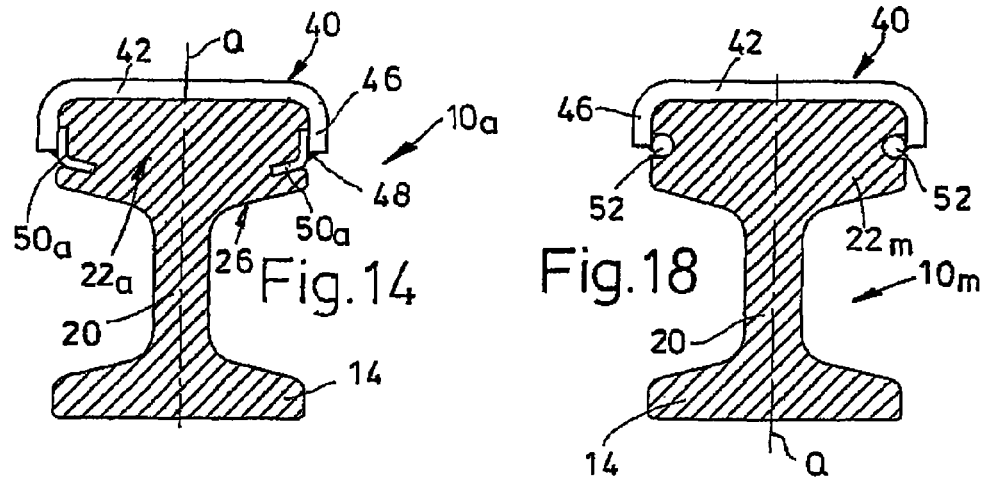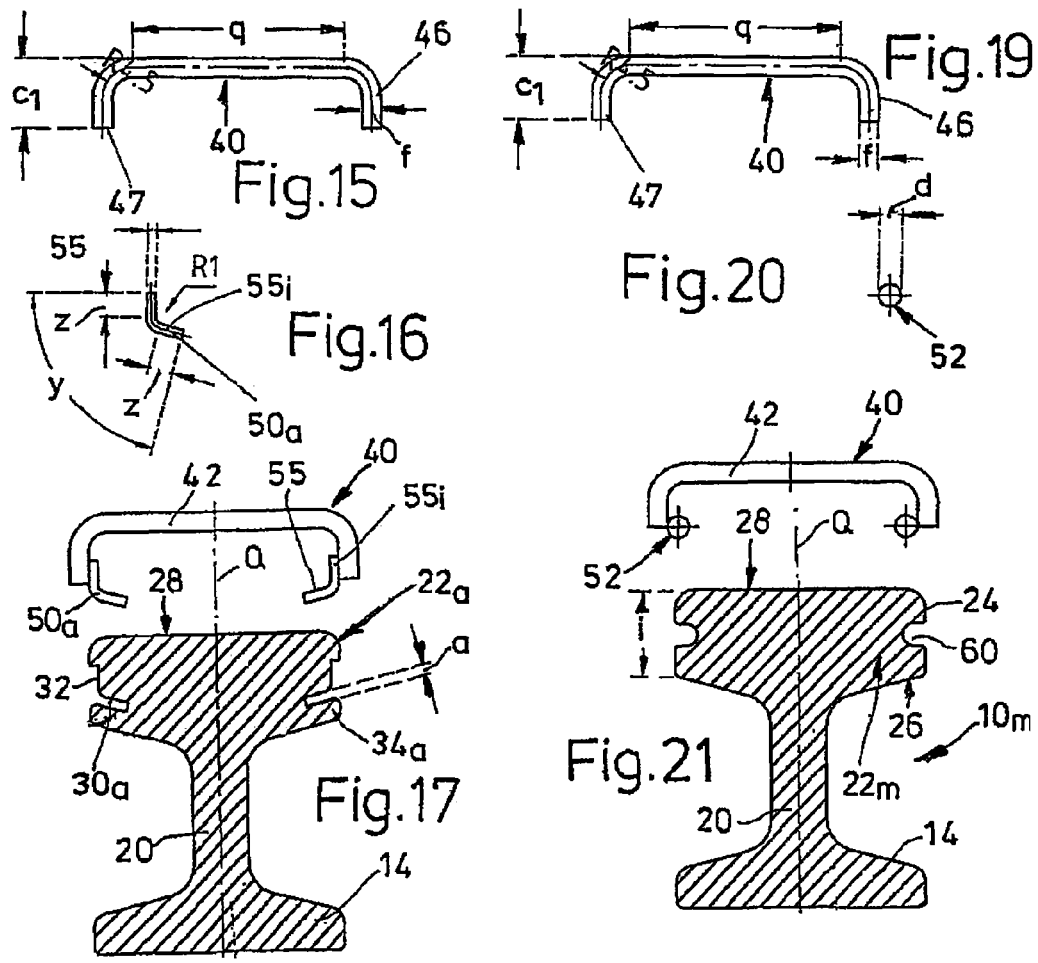

COMPOSITE PROFILE PROVIDED WITH A SUPPORT BODY MADE OF A LIGHT METAL MATERIAL AND A PROFILED STRIP AND A METHOD FOR PRODUCING SAID PROFILE

CROSS REFERENCE TO RELATED APPLICATIONS

This application is related to U.S. application Ser. No. 11/711,397 filed Feb. 27, 2007 and U.S. application Ser. No. 11/708,210 filed Feb. 20, 2007.

BACKGROUND OF THE INVENTION

The invention concerns a composite profile having a rail-like support body extruded from light metal material and a profile strip spanning its top surface and made of a harder metal. Also, the invention covers a method for making such a composite profile.

In DE 24 32 541 A1 can be found a method for making conductor rails consisting of a carrier profile and at least one covering which forms at least part of the upper surface of the carrier profile serving as the conductor and consists of a profile strip of a different metal as a covering profile with high abrasion resistance. During an extrusion process, the carrier profile is produced by forcing a bar out through the shaping cross-section of an extrusion die, and at the same time the profile strip passes through the die aperture or shaping cross-section parallel to the longitudinal axis of the die. During the extrusion process, an intimate metal bond is produced between the two profile components. For example, if the conductor rail is used to electrify rail-mounted vehicles, detachment of the profile strip from its support profile made of light metal takes place in the long term in cases of particularly high load in spite of the intimate metal bond.

In DE 44 10 688 A1 can be found a composite profile having a carrier profile made of light metal and a profile strip bonded thereto. The latter spans the upper surface of a rail head of the carrier profile, is channel-shaped in cross-section and comprises in its side arms—projecting from its inner surface on the support body side at a distance from each other—bulges which are embedded in the support body. These bulges define undercut gaps which are filled by the metallic material of the support body in form-locking relationship. This form-locking connection does not have the problems described for the metallic bond.

A composite conductor rail element for the power supply of a railway vehicle having a covering made of a material with high mechanical resistance which is rigidly attached to a rod made of material which is a good conductor of electricity, and forms the sliding or contact surface for current collectors of the vehicle, is disclosed by DE 25 46 026 A1. The covering is fixed to the conductive rod which serves as the carrier by clamping or squeezing the edges of the covering in the conductive rod. At least one indentation running in the longitudinal direction forms in the covering, penetrating into the conductive rod. For locking the edges of the covering, in the conductive rod is provided a groove which separates off a lip. The latter leads to locking of the covering to the conductive rod as soon as it has been at least partially folded over and pressed against the edge of the covering.

Conductor rails of which the wear components are attached to the live carrier profile by screws or additional insertion members passing through them laterally, have also proved to be disadvantageous. Other known manufacturing methods may disadvantageously lead to undulations on the upper surface of the covering profile which originate from stepwise caulking or stamping of the carrier profile.

Knowing this state of the art, the inventor set himself the aim of further improving the bond between carrier profile and profile strip while retaining the special possibilities of economic manufacture.

SUMMARY OF THE INVENTION

The foregoing object is achieved wherein attached to the profile strip or covering profile which more or less rests on the top or upper surface of the carrier profile and is preferably made of special steel, on each of its longitudinal sides, is an anchor or insertion rod which is parallel to the longitudinal axis of the profile strip and which on the other side engages in a lateral insertion slot in the carrier profile; the insertion rod or insertion profile is preferably made of the material of the profile strip and joined to the latter by a weld seam. The insertion rods complement the profile strip on both sides and, owing to the welded connection, form a reliable protection for the inside surface of the live carrier profile.

According to a further characteristic of the invention, the thickness of the insertion end of the profile-like insertion rod corresponds to the width of the insertion slot in the carrier profile, so that the components are firmly seated on each other.

With a profile strip of channel-like shape which rests on the rail head of a rail-like carrier profile, it proved advantageous to connect the insertion rod to a side arm formed integrally on a base plate of the profile strip, and on the other side to insert it with at least one rod section projecting from that side arm, in the correspondingly arranged insertion slot in the carrier profile. The weld seam is advantageously to run at the end face of the side arm of that profile strip.

A channel-like insertion rod of approximately V-shaped cross-section which abuts by one channel arm against the inside of the side arm of the profile strip is preferred; the other channel arm is then directed towards the longitudinal axis of the profile strip. With this design, the cross-section of the slot in the rail head of the carrier profile is in turn V-shaped, the slot arm running in the side or longitudinal surface of the rail head being formed by a longitudinal indentation. Another insertion rod according to the invention is of angular cross-section, which with one channel arm abuts against the inside of the side arm; the other channel arm is inclined away from the base plate of the profile strip, or alternatively towards it. In this case the angle defined by the two channel arms is to measure more than 90°, preferably about 110°.

Within the scope of the invention is also an insertion rod of approximately semicircular cross-section, which at the vertex of its curvature is welded by the outer surface to the edge of the end face of the side arm of the profile strip in such a way that the two insertion rods of the profile strip are arranged in a common centre axis and open towards each other. This centre axis intersects the cross-sectional axis of the composite profile, which is in turn parallel to its side surfaces. Also, the centre axis of the insertion rods in each of the two longitudinal surfaces of the rail head is to define the position of a bead of which the cross-section is adapted to the shape of the interior of the insertion rod to be joined to it, and which is defined on each of two sides by an insertion slot for the free edge of the insertion rod.

The cross-section of another embodiment of the insertion profile or rod for the rail head according to the invention consists of a quadrant section and a linear section, which latter abuts on the inside against the side arm of the profile strip and is welded to its end face. These quadrant sections of the two insertion rods can be directed towards the base plate of the profile strip or away from it. The slot in the rail head for the linear section of the insertion rod is here to contain a longitudinal indentation in the longitudinal surface of the rail head. Furthermore, care must be taken that the pairs of identical insertion rods provide an inversely symmetrical design.

According to another characteristic of the invention, an insertion rod of hook-shaped cross-section having a free hook section directed towards the base plate of the profile strip and running at a distance from the side arm is welded at the other end to the end face of the side arm.

Also, it proved favourable to let a longitudinal rib formed integrally at a distance from the surface of the rail head and defined by the lower surface of the rail head engage under the slot-like indentation in the rail head.

In an alternative embodiment to the above-described mounting of the insertion rod of hook-shaped cross-section having a free hook section running at a distance from the inner surface of the side arm of the profile strip, the free hook section points away from the base plate of the profile strip, that is, towards the bottom region of the composite profile. This insertion rod too is welded to the end face of the side arm.

Another embodiment covers an insertion rod of step-shaped cross-section which at one end is welded to the inner surface of the side arm of the profile strip and at the other end with its free hook end engages behind a peg strip in the longitudinal surface of the rail head.

Also within the scope of the invention are insertion rods of linear cross-section, that is, strip-shaped, which are laid on the inside against the side arms of the profile strip and project beyond their respective end face to which they are joined by means of a continuous weld seam. Such an insertion rod of linear cross-section is according to the invention at one end welded to the end face of a side arm of the profile strip and inclined to the longitudinal axis of the cross-section of the composite profile at an angle of approximately 60° to 80°, preferably 70° to 75°.

It proved favourable to fix to the inner side of the side arm of the profile strip in the region of its end face a linear insertion rod parallel to the longitudinal axis of the profile strip, namely a round bar having a diameter of 5 to 10 mm, for example. For this, in the flank or longitudinal surfaces of the rail head of this composite profile is preferably formed in each case a longitudinal groove of which the bottom is arcuate in cross-section, in adaptation to the round bar.

A different shape of the rail body is also within the scope of the invention, namely a box-shaped carrier profile on the upper surface of which rests a plate-shaped profile strip at the longitudinal edges of which in each case an insertion rod is held by a weld seam. Here, the width of the profile strip is shorter than the width of the carrier profile, and each of the insertion rods is inserted in a slot which is allocated to a step indentation in the carrier profile.

The invention also covers a composite profile for making a composite profile in which a carrier profile having a top surface and insertion slots accompanying the latter on both sides is extruded from light metal material, also an insertion rod is introduced into each insertion slot and a profile strip overlapping the top surface is laid against a section of the insertion rod extending out of the insertion slot. The insertion rod is continuously welded to the profile strip.

First, therefore, the anchoring strips, anchor rods or insertion rods are laid or pressed or rolled into the light metal profile, in particular an aluminium base profile, or before welding or afterwards rolled or pressed hard by plastic deformation of the carrier profile. There is then provision for pressing the special steel covering profile onto the light metal carrier profile by means of a large-diameter pressure roller, and welding the anchoring strips or insertion rods on the right and left at the same time to the covering profile under this bias.

Furthermore, the so-called covering profile is preferably a special steel strip which is cut from a coil and which is given the desired shape by roll-shaping or used directly as a cut tape. The insertion rod is a special steel strip—preferably the same alloy as the covering profile—which advantageously has been cut from the coil and given the desired shape by roll-shaping/chamfering/folding the edge up or over.

To remedy the above-mentioned faults, a continuously progressing composite profile is proposed—such as extrusion for the carrier profile and roll-shaping—over the whole profile length of covering profile and insertion rods or anchoring profiles. Joining is carried out by continuous welding over the profile length.

A requirement is a maximum possible width of the sliding surface with the possibility of brushing from the side and mechanical anchoring which, even when the wear profiles are completely worn down, ensures anchoring of the sliding surfaces of which two then remain. Also, a reduction of the fitted height tolerances compared with known composite profiles is desirable. The possibility of local manufacture worldwide without having to upgrade a large light metal extruder is also desirable.

BRIEF DESCRIPTION OF THE DRAWINGS

Further advantages, characteristics and details of the invention are apparent from the description below of preferred embodiments as well as with reference to the drawings; these show FIGS. 1, 9: in each case an oblique view of a section of a rail-shaped composite profile consisting of two composite partners;

FIG. 2: the cross-section through the composite profile of FIG. 1 full size with a component removed from the composite profile;

FIGS. 3, 4: in each case a smaller cross-section than FIG. 2 through a composite profile of a different design;

FIGS. 5, 6, 7, 8: in each case two halves of the cross-sections of two different composite profiles;

FIG. 10: the cross-section through the composite profile of FIG. 9;

FIG. 11: an end view of one composite partner;

FIG. 12: a side view of two elements of the composite partner of FIG. 11;

FIG. 13: the two composite partners of FIG. 10 before assembly;

FIGS. 14 and 18: two further embodiments of composite profiles consisting of two composite partners;

FIGS. 15 and 19: an end view of one composite partner in FIG. 14 or 18;

FIGS. 16 and 20: a side view of two elements of the composite partner of FIG. 15 or 19;

FIGS. 19, 20: views of FIGS. 14 and 18 corresponding to the elements of FIGS. 11, 12;

FIGS. 17 and 21: in each case the two composite partners of FIG. 14 or 18 before their assembly;

DETAILED DESCRIPTION

Figures 1, 2:
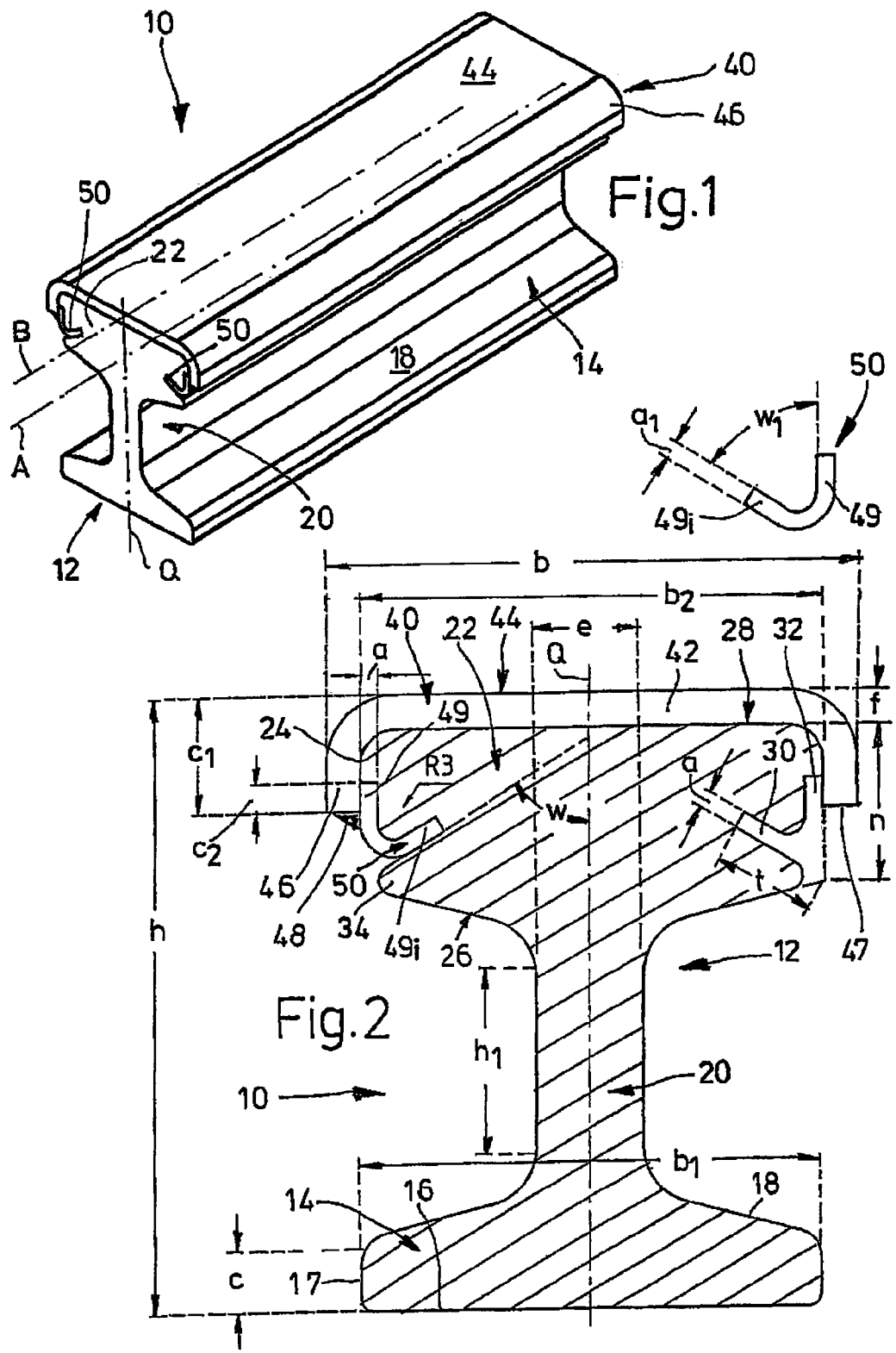

A composite profile 10 having a height h of 105 mm here and a maximum width b of 92 mm comprises according to FIG. 1 a rail-shaped carrier profile 12 with a rail base 14 and an endless rail head 22 formed integrally on the rail base 14 by means of a rail stem 20. Two longitudinal edges 17 with a height c of 10 mm defining the bottom surface 16 of the rail base 14 run parallel to each other at a distance $b_1$ of 80 mm here.

From these longitudinal edges 17, the two roof surfaces 18 of the rail base 14 are inclined slightly upwards to the cross-sectional centre axis Q traversing the longitudinal axis A of the composite profile 10, and merge with that rail stem 20 having a height $h_1$ of approximately 30 mm and a thickness e of approximately 18 mm. From the upper end of the rail stem 20 extend the lower surfaces 26 of the rail head 22 which are inclined approximately upwards to the longitudinal edges 24 of this rail head 22, which has a width $b_2$ of 78 mm and of which the outside height n of approximately 28 mm defines the position of the upper surface 28 of the rail head 22.

From each of the longitudinal edges 24 of the rail head 22 in FIG. 1 extends an insertion slot 30 which is inclined upwards at an angle w of approximately 60° and has a width a of 4 mm here and a depth t of 18 mm, and of which the lower wall surface in FIG. 2 merges with a kind of longitudinal rib 34 of the rail head 22, the outside of which is formed by that lower surface 26. In the longitudinal edge 24 is formed a longitudinal indentation 32 as a spatial extension of the slot 30 of V-shaped cross-section, which also provides its width a.

This rail or carrier profile 12 of the composite profile 10 is formed from a light metal material in an extruder, not shown in the drawings for reasons of clarity.

The top or upper surface 28 of the rail profile 12 or its rail head 22 is spanned in the final state by a profile strip 40 having a thickness f of 6 mm, which is made from a ferrous or non-ferrous metal. This profile strip 40 is channel-shaped in cross-section, and its side arms 46 which extend from a base plate 42 and are parallel to each other and to the longitudinal axis B of the profile strip 40 and which have a height $c_1$ of 20 mm abut against the longitudinal edges 24 of the rail head 22. In this position the outer surface 44 of the profile strip 40 forms the upper surface of the composite profile 10.

Associated with parallel axis with each side arm 46 of the profile strip 40 resting on the upper surface 28 of the rail head 22 in the embodiment of FIGS. 1 and 2 on the inside is a channel-shaped insertion rod 50 of approximately V-shaped cross-section having an apex angle $w_1$ of approximately 65°, of which the channel arms 49, $49_i$ provide a thickness $a_1$ which corresponds with a slight clearance to the width a of the insertion slot 30. One of these channel arms 49 which are linear in cross-section abuts with its outer side—running parallel to the cross-sectional longitudinal axis Q—against the side arm 46 of the profile strip 40 on the inside in a contact width $c_2$ of 5 mm and is welded thereto in sealing fashion by a weld seam shown at 48. The latter runs at the end face 47 of the side arm 46 of the profile strip. The other channel arm $49_i$ is inserted in the adjacent slot 30 in the rail head 22. Thus a permanent and sealing combination of the two composite partners 12, 40 of the composite profile 10 is formed.

The rail head $22_a$ of the composite profile $10_a$ according to FIG. 3 has, instead of a V-shaped slot, an insertion slot $30_a$ of angular cross-section which has a width (radius 4 mm) for a correspondingly shaped insertion rod $50_a$ of the profile strip 40, which is inherently shaped according to FIG. 2. Towards the rail base 14, the insertion slot $30_a$ is defined by an upwardly inclined longitudinal rib $34_a$ of the rail head $22_a$. This insertion slot $30_a$ receives the free end 55 of the cross-section of the insertion rod $50_a$ which in a side view is a longitudinal strip.

The profile strip 40 of FIG. 4 too is essentially designed according to FIG. 2; with this composite profile $10_b$, however, the two insertion profiles or insertion rods $50_b$ are semicircular in cross-section and in each case welded at their vertex to the end face 47 of a side arm 46 of the profile strip 40. The insertion rods $50_b$ opening towards each other at a centre axis M intersecting the cross-sectional longitudinal axis Q encompass at the rail head $22_b$ a bead 36 of arcuate cross-sectional contour which is defined on both sides by longitudinal ribs $34_b$, forming insertion slots 35 for the cross-sectional ends of the insertion rod $50_b$.

FIG. 5 shows in each case one half of two composite profiles $10_c$, $10_d$ ending at the cross-sectional longitudinal axis Q; the other halves, not shown, are shaped accordingly. Associated with the profile strip 40 of the left design in FIG. 5 is an insertion rod $50_c$ having a thickness $a_1$ of which the cross-section consists of an arcuate section 54 and a linear section $49_c$ which is welded to the corresponding side arm 46 of the profile strip 40. That arcuate section 54 extends towards the rail base 14. In the embodiment on the right side of FIG. 5, the insertion rod $50_c$ is fixed in such a way that the arcuate section 54 is directed towards the base plate 42 of the profile strip 40. In both composite profiles $10_c$, $10_d$ the linear section rests in a longitudinal indentation 32 of the rail head $22_c$ or $22_d$, which merges with a slot $30_c$ of curved cross-section.

FIG. 6 too shows two insertion profiles or insertion rods $50_e$ directed in opposite directions to each other and having an angled or hooked—and inherently identical—cross-sectional shape with corresponding slots in the rail head $22_e$ or $22_f$ of the composite profile $10_e$, $10_f$. These insertion rods $50_e$ too are welded to the end face 47 of the side arm 46 of the profile strip, and with their free hook section 56 engage behind a parallel-axis peg strip 37 having the width $k_1$ of the rail head $22_e$ or $22_f$.

An insertion rod $50_g$ which is essentially stepped in cross-section runs in the composite profile $10_g$ of FIG. 7; it is firstly welded to the inner surface of the side arm 46 and secondly engages with its free hook end 56 behind a peg strip 37 in the longitudinal surface 24 of the rail head $22_g$.

An insertion rod 51 of linear cross-section and having a thickness $a_2$ of 4 mm is laid on the inside against the side arm 46 of the profile strip 40 of composite profile $10_h$ of FIG. 7 and is welded to the end face 47 of the side arm 46 in such a way that the free cross-sectional end—which is parallel to the latter—engages behind a peg strip 37 of the rail head $22_h$.

In both embodiments of FIG. 8, a linear insertion rod 51 having a free length k of 15 mm is welded to the end edge or end face 47 of each of the side arms 46 of the profile strip 40 in such a way that it runs inwardly at an angle $w_2$ of approximately 70° to 75° to the cross-sectional longitudinal axis Q. In the composite profile $10_i$ on the left side of the figure, the insertion rod 51 is directed towards the base plate 42, and in the other composite profile $10_k$ it points away from the base plate 42. The corresponding slots 30 in the rail head 21 or $22_k$ run in each case above a longitudinal rib 34 or $34_a$.

The composite profile $10_e$ of FIGS. 9 to 13 contains two insertion rods $50_a$ of which the shape has been described for FIG. 3. By contrast with that drawing, here the free ends 55 of the insertion rods $50_a$ point upwards, that is, towards the base plate 42 of the profile strip 40.

In FIG. 11 can be seen the exact design of the profile strip 40 of which the straight width q here measures 68 mm with a stretched length of approximately 116 mm and an area of approximately 697 millimeters [Mat. 1.4016 (X 6 Cr 17), with 5373.1 g/m].

The insertion rod $50_a$ of FIG. 12 defines, with its two profile arms 55, $55_i$ having a length z of 7.8 mm and 5.8 mm ($z_i$) and the end faces 57, an angle y of 65°. FIG. 13 shows the length of the slots 30 described above and longitudinal indentations 32 in the rail head $22_e$.

FIGS. 14 to 17 show the cycle discussed for FIGS. 10 to 13 for the embodiment of FIG. 3. FIG. 15 corresponds to FIG. 11. In FIG. 16 the length z or $z_1$ of the two profile arms 55, $55_i$ of the insertion rod $50_a$ measures 5.6 mm and the angle y here is 76°.

A round bar 52 having a diameter d of 7 mm is welded on the inside in each case to the side arms 46 of the profile strip 40 of FIGS. 18 to 21. Here, the stretched length is approximately 112 mm, and the area approximately 674 mm [Mat. 14016 (X6Cr17) 5189.8 g/m)].

To receive the round bar 52 in clamping fashion, at the vertical centre of the longitudinal edges or surfaces 24 having a height i of 28 mm of the rail head $22_n$ is formed in each case a longitudinal groove 60 of which the bottom is cross-sectionally defined by a semicircle.

Figure 22:
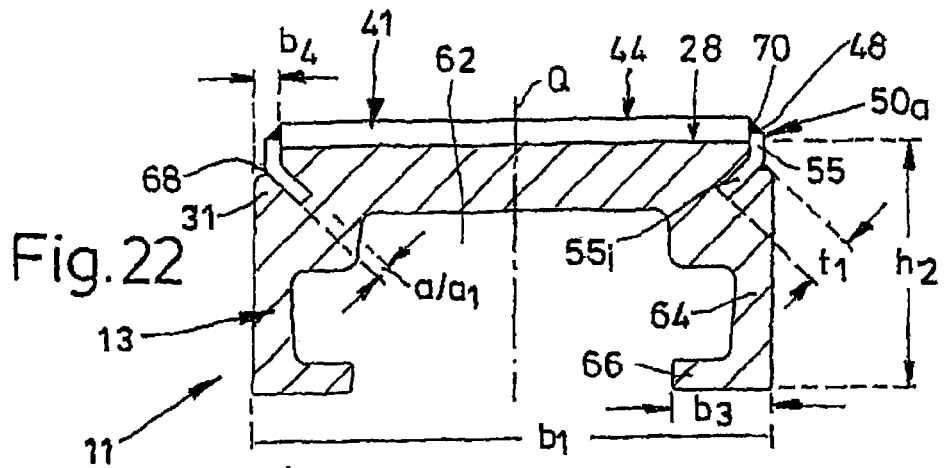
FIGS. 22 to 24: three other embodiments of composite profiles in an end view.
Figure 23:
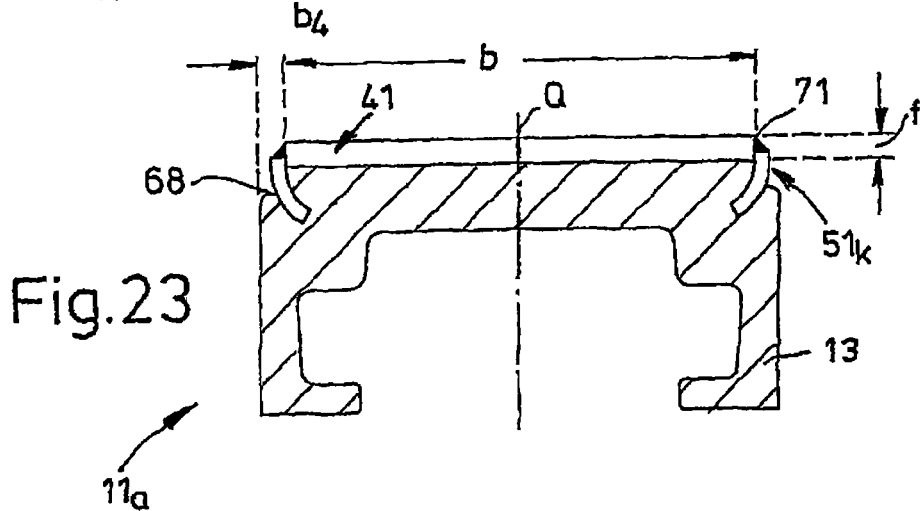
Figure 24:
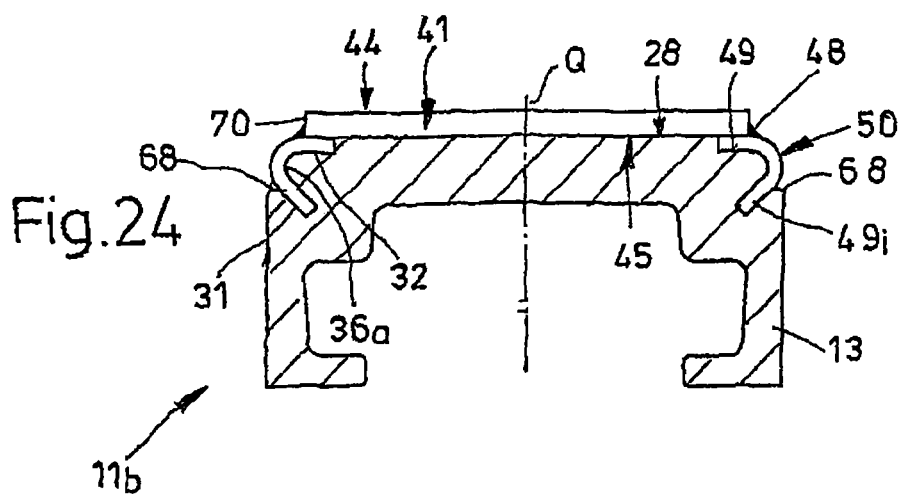

The box-shaped carrier profile 13 of the composite profile 11 of FIGS. 22 to 24 has an essentially rectangular cross-sectional shape with a width $b_1$ of 105 mm and a height $h_2$ of 50 mm and is provided with an interior 62 which is defined on both sides by profile arms 64 from which in each case project bottom webs 66 aligned parallel to the upper surface 28 and with each other and having a width $b_3$ of 20 mm. That upper surface 28 is narrower than the carrier profile 13, as each of its upper corner edges has a step indentation 68 with a width $b_4$ of 5 mm. From the latter in FIG. 22 extends a slot 31 which is directed substantially diagonally to the cross-sectional area and which has a width a of approximately 3 mm and a length $t_1$ of approximately 9 mm. The slot 31 serves to receive an insertion rod $50_a$ of angled cross-section which is welded with one profile arm $55_i$ to the longitudinal edge 70 of a plate-shaped profile strip 44 of which the width b measures approximately 95 mm with a thickness f of 5 mm. The free profile arm 55 sits in the slot 31.

The composite profiles $11_a$ and $11_b$ and their carrier profiles 13 in FIGS. 23 and 24 differ in the shape of the insertion profiles or insertion rods $51_k$ or 50 of their profile strips 41. The insertion rod $51_k$ of FIG. 23 is similar to that of the composite profile $10_h$, but is slightly bent. The insertion rod 50 of FIG. 24 corresponds to that of FIGS. 1, 2. However, it is laid with one channel arm 49 against the lower surface 41 of the profile strip 41 and thus welded; the weld seam 48 runs at the longitudinal edge 70 of the profile strip 41 and the outer surface of the channel arm 49. The corner region of the carrier profile 13 is correspondingly shaped with a longitudinal indentation 32 in the top or upper surface 28 of the carrier profile $13_b$ and that step indentation 68, between which a bead $36_a$ runs parallel to the longitudinal axis of the profile.

The invention claimed is:

1. A composite profile comprising a carrier profile of light metal material and a profile strip of a harder metal material than that of the carrier profile, the profile strip has a longitudinal axis B and comprises a base plate which spans a top surface of the carrier profile and longitudinal sides extending from the top surface and substantially parallel to the longitudinal axis B, and an insertion rod having a first portion engaged in a slot in the carrier profile and a second portion bonded to the profile strip wherein the bond comprises a weld seam, wherein the profile strip is of channel-like shape which rests on the carrier profile, the insertion rod is connected to a side arm formed integrally on a base plate of the profile strip, and on the other side engages with at least one rod section projecting from the side arm, in the slot in the carrier profile, and wherein a channel-like insertion rod of approximately V-shaped cross-section abuts one channel arm against the inside of the side arm of the profile strip, an other channel arm being directed towards the longitudinal axis (B) of the profile strip.

2. Composite profile according to claim 1, wherein the profile strip is steel.

3. Composite profile according to claim 1, wherein the insertion rod is formed of the same material as the profile strip.

4. Composite profile according to claim 1, wherein the first portion of the insertion rod has a thickness which corresponds to a width (a) of the slot.

5. Composite profile according to claim 1, wherein the weld seam runs at an end face of the side arm.

6. Composite profile according to claim 1, wherein a V-shaped cross-section of the slot (30) in the rail head (22) of the carrier profile (12), one of the slot arms being a longitudinal indentation (32) in the side or longitudinal surface (24) of the rail head.

7. Composite profile according to claim 6, wherein an apex angle ($w_1$) of the channel cross-section is approximately 60° to 70°.

8. A composite profile comprising a carrier profile of light metal material and a profile strip of a harder metal material than that of the carrier profile, the profile strip has a longitudinal axis B and comprises a base plate which spans a top surface of the carrier profile and longitudinal sides extending from the top surface and substantially parallel to the longitudinal axis B, and an insertion rod having a first portion engaged in a slot in the carrier profile and a second portion bonded to the profile strip wherein the bond comprises a weld seam, wherein the profile strip is of channel-like shape which rests on the carrier profile, the insertion rod is connected to a side arm formed integrally on a base plate of the profile strip, and on the other side engages with at least one rod section projecting from the side arm, in the slot in the carrier profile, and wherein an insertion rod of angular cross-section having one channel arm which abuts against an inside of the side arm of the profile strip, and the other channel arm being inclined away from the base plate (42) of the profile strip or towards it.

9. Composite profile according to claim 8, wherein the angle defined by the two channel arms is more than 90°.

10. A composite profile comprising a carrier profile of light metal material and a profile strip of a harder metal material than that of the carrier profile, the profile strip has a longitudinal axis B and comprises a base plate which spans a top surface of the carrier profile and longitudinal sides extending from the top surface and substantially parallel to the longitudinal axis B, and an insertion rod having a first portion engaged in a slot in the carrier profile and a second portion bonded to the profile strip wherein the bond comprises a weld seam, wherein the profile strip is of channel-like shape which rests on the carrier profile, the insertion rod is connected to a side arm formed integrally on a base plate of the profile strip, and on the other side engages with at least one rod section projecting from the side arm, in the slot in the carrier profile, and wherein the insertion rod is of approximately semicircular cross-section and at its vertex is welded to an end face of the side arm of the profile strip.

11. Composite profile according to claim 10, wherein two insertion rods of the profile strip are arranged on a common centre axis (M) and open towards each other.

12. Composite profile according to claim 11, wherein the centre axis (M) of the insertion rods intersects a cross-sectional longitudinal axis (Q) of the composite profile.

13. Composite profile according to claim 12, wherein the centre axis (M) of the insertion rods in each of the two longitudinal surfaces of the rail head defines the position of a bead of which the cross-section is adapted to the shape of the interior of the insertion rod, and which is defined on each of two sides by an insertion slot.

14. A composite profile comprising a carrier profile of light metal material and a profile strip of a harder metal material than that of the carrier profile, the profile strip has a longitudinal axis B and comprises a base plate which spans a top surface of the carrier profile and longitudinal sides extending from the top surface and substantially parallel to the longitudinal axis B, and an insertion rod having a first portion engaged in a slot in the carrier profile and a second portion bonded to the profile strip wherein the bond comprises a weld seam, wherein the profile strip is of channel-like shape which rests on the carrier profile, the insertion rod is connected to a side arm formed integrally on a base plate of the profile strip, and on the other side engages with at least one rod section projecting from the side arm, in the slot in the carrier profile, and wherein an insertion rod of hook-shaped cross-section having a free hook section directed towards the base plate of the profile strip and running at a distance ($k_1$) from the side arm of the profile strip is welded at the other end to the end face of the side arm.

15. A composite profile comprising a carrier profile of light metal material and a profile strip of a harder metal material than that of the carrier profile, the profile strip has a longitudinal axis B and comprises a base plate which spans a top surface of the carrier profile and longitudinal sides extending from the top surface and substantially parallel to the longitudinal axis B, and an insertion rod having a first portion engaged in a slot in the carrier profile and a second portion bonded to the profile strip wherein the bond comprises a weld seam, wherein the profile strip is of channel-like shape which rests on the carrier profile, the insertion rod is connected to a side arm formed integrally on a base plate of the profile strip, and on the other side engages with at least one rod section projecting from the side arm, in the slot in the carrier profile, and wherein an insertion rod of hook-shaped cross-section having a free hook section running at a distance ($k_1$) from the side arm (46) of the profile strip (40) and directed away from its base plate (42) is welded at the other end to the end face (47) of the side arm.

16. A composite profile comprising a carrier profile of light metal material and a profile strip of a harder metal material than that of the carrier profile, the profile strip has a longitudinal axis B and comprises a base plate which spans a top surface of the carrier profile and longitudinal sides extending from the top surface and substantially parallel to the longitudinal axis B, and an insertion rod having a first portion engaged in a slot in the carrier profile and a second portion bonded to the profile strip wherein the bond comprises a weld seam, wherein the profile strip is of channel-like shape which rests on the carrier profile, the insertion rod is connected to a side arm formed integrally on a base plate of the profile strip, and on the other side engages with at least one rod section projecting from the side arm, in the slot in the carrier profile, and wherein an insertion rod of step-shaped cross-section which at one end is welded to the inner surface of the side arm of the profile strip and at the other end with its free hook end engages behind a peg strip of the longitudinal surface (24) of the rail head.

17. A composite profile comprising a carrier profile of light metal material and a profile strip of a harder metal material than that of the carrier profile, the profile strip has a longitudinal axis B and comprises a base plate which spans a top surface of the carrier profile and longitudinal sides extending from the top surface and substantially parallel to the longitudinal axis B, and an insertion rod having a first portion engaged in a slot in the carrier profile and a second portion bonded to the profile strip wherein the bond comprises a weld seam, wherein the profile strip is of channel-like shape which rests on the carrier profile, the insertion rod is connected to a side arm formed integrally on a base plate of the profile strip, and on the other side engages with at least one rod section projecting from the side arm, in the slot in the carrier profile, and wherein an insertion rod of linear cross-section which at one end is welded to the end face of a side arm of the profile strip and is inclined to a longitudinal axis (Q) of the cross-section of the composite profile at an angle ($w_2$) of approximately 60° to 80°.

18. A composite profile comprising a carrier profile of light metal material and a profile strip of a harder metal material than that of the carrier profile, the profile strip has a longitudinal axis B and comprises a base plate which spans a top surface of the carrier profile and longitudinal sides extending from the top surface and substantially parallel to the longitudinal axis B, and an insertion rod having a first portion engaged in a slot in the carrier profile and a second portion bonded to the profile strip wherein the bond comprises a weld seam, wherein the profile strip is of channel-like shape which rests on the carrier profile, the insertion rod is connected to a side arm formed integrally on a base plate of the profile strip, and on the other side engages with at least one rod section projecting from the side arm, in the slot in the carrier profile, and wherein fixed to the inner side of the side arm of the profile strip in the region of its end face is a linear insertion rod parallel to the longitudinal axis (B) of the profile strip, and wherein the insertion rod comprises a round bar having a diameter (d) of approximately 5 to 10 mm.

19. Composite profile according to claim 18, wherein in a flank or longitudinal surfaces of the rail head of the composite profile is formed a longitudinal groove of which a bottom is arcuate in cross-section and adapted to the shape of the round bar.

20. Composite profile according to claim 18, wherein the carrier profile is box-shaped and on an upper surface rests a plate-shaped profile strip at the longitudinal edges of which in each case an insertion rod is held by a weld seam.

21. Composite profile according to claim 20, wherein a width (b) of the profile strip is shorter than a width ($b_1$) of the carrier profile, and each of the insertion rods is inserted in a slot which extends from a step indentation in the carrier profile.

22. Composite profile according to claim 21, wherein the step indentation is arranged in two mutually opposed corner regions of the carrier profile.

* * * * *